(12) United States Patent
Jeong

(10) Patent No.: US 6,889,930 B2
(45) Date of Patent: May 10, 2005

(54) SEATBELT RETRACTOR OF AN AUTOMOBILE

(75) Inventor: Byoung Tae Jeong, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/676,649

(22) Filed: Sep. 30, 2003

(65) Prior Publication Data

US 2004/0113008 A1 Jun. 17, 2004

(30) Foreign Application Priority Data

Dec. 12, 2002 (KR) .............................. 10-2002-0078998

(51) Int. Cl.$^7$ .............................................. B65H 75/48
(52) U.S. Cl. .................................................. 242/381
(58) Field of Search ......................... 242/381; 297/478; 280/806

(56) References Cited

U.S. PATENT DOCUMENTS

| 365,481 | A | * | 6/1887 | Lyman | 242/381 |
| 1,004,753 | A | * | 10/1911 | Doust | 242/381 |
| 2,159,004 | A | * | 5/1939 | Bosch | 242/381 |
| 4,009,844 | A | * | 3/1977 | Gomez | 242/381 |

* cited by examiner

Primary Examiner—John M. Jillions
(74) Attorney, Agent, or Firm—Morgan Lewis & Bockius LLP

(57) ABSTRACT

The present invention relates to a seatbelt retractor of an automobile, which is provided with a frictional clutching means for decreasing the rotating speed of a drum shaft where a webbing and a spiral spring are fixed, whereby locking of a vehicle sensor is inhibited by reducing the shock caused by sudden expansion of the spiral spring.

8 Claims, 2 Drawing Sheets

SEATBELT RETRACTOR OF AN AUTOMOBILE

CROSS-REFERENCE TO RELATED APPLICATIONS

This application claims priority of Korean Application No. 2002-78998, filed on Dec. 12, 2002, the disclosure of which is incorporated fully herein by reference.

FIELD OF THE INVENTION

The present invention relates to an automobile seatbelt retractor, and more particularly to a seatbelt retractor including a frictional clutching means for reducing the rotating speed of a drum shaft in which a webbing is fixed and a spiral spring is equipped, whereby locking of a vehicle sensor is preferably prevented by decreasing the shock caused by sudden expansion of the spiral spring.

BACKGROUND OF THE INVENTION

In general, a seatbelt installed in a vehicle functions to restrain the body of a passenger in case of an accident so as to reduce a shock delivered to the passenger and to prevent the passenger from colliding with the interior of the vehicle due to inertial force. Most automobiles employ a three-point type seatbelt that is composed of a shoulder belt for securing the upper body of a passenger and a lap belt for securing the waist of a passenger.

As well known to the public, safety and reliability of seatbelts has been proved through repeated collision tests and the seatbelt, therefore, is an inevitable safety system in automobiles for protecting passengers in case of an accident. Recently developed seatbelts include webbing control means that adjust the restraining point of a seatbelt in accordance with the size of the passenger, or a retractor that reduces the restriction of movement of the passenger in a normal state while sufficiently protecting the passenger in case of an accident.

The retractor, one element of a seatbelt assembly, is a device for retracting the webbing. It typically includes means that prevent the webbing from being drawn out in an abnormal state, such as in a collision. Because the performance of a seatbelt mainly depends on the retractor, various types of retractors have been developed for improving safety and reliability of a seatbelt. Such retractors are disclosed, for example, in U.S. Pat. Nos. 6,254,191, 5,232,177, 4,436,255.

Prior retractors, however, can be disadvantageous in that the webbing can be excessively wound up due to an unregulated restoring force of the spiral spring installed on the ratchet wheel. A mechanical shock is generated by sudden expansion of the spiral spring, which results in locking of a vehicle sensor, namely, unintentional engagement of a ratchet wheel and a latch. Because the unintentional engagement of the ratchet wheel and the latch occurs when a webbing is fully wound up, it can be mechanically impossible to release the engagement without taking apart the elements.

SUMMARY OF THE INVENTION

In one embodiment, the present invention provides a seatbelt retractor of an automobile including a frictional clutching means operating in response to the movement of a spiral spring installed in a drum in order to reduce the rotating speed of the drum shaft in which the webbing is fixed, whereby locking of the vehicle sensor is preferably prevented by decreasing the shock caused by sudden expansion of the spiral spring.

In a preferred embodiment, a seatbelt retractor according to the present invention comprises a frictional clutching means equipped in a drum, which reduces rotating speed of a drum shaft in response to the expansion of a spiral spring during a retraction of a webbing. The frictional clutching means may comprise a first rod member that is slidably inserted into a guide element so that the first rod member can slide through the guide element in accordance with expansion of a spiral spring, the first rod member being provided with a guide slot at the center thereof. A restoring spring is disposed at one end of said first rod member. A gear member is pivotally fixed to the wall of a drum by a pivot shaft and is slidably connected to the guide slot by a guide pin. A second rod member laterally slides and engages with teeth of the gear member. Formed at the one end of the second rod member is a recess of semicircular shape for tight contact with the circumference of the drum shaft. Moreover, the second rod member is preferably composed of two parts that are elastically connected to each other by a spring.

In a further alternative embodiment, a seatbelt retractor according to the present invention includes a drum and frictional clutch. The drum contains a rotatable drum shaft and a spiral spring acting between the drum and shaft. The shaft is configured and dimensioned for winding a seatbelt webbing thereon. The frictional clutch is operatively connected to the spiral and acts on the drum shaft in response to an increase of the spiral spring.

In a preferred embodiment the frictional clutch includes an actuator rod, a friction rod and a linkage. The actuator rod is slidably mounted with the drum and bears against the spiral spring. The friction rod bears against the drum shaft. The linkage is operatively connected to the actuator rod and friction rod so as to apply pressure to the drum shaft in response to expansion of the spiral spring. The friction rod may comprise a first part and a second part with a biasing element acting therebetween. Also, a biasing element preferably acts on the actuator rod to bias it against the spiral spring. The linkage preferably comprises a gear segment pivotally mounted between the rods with a first end acted on by the actuator rod and a second, geared end engaged with gear teeth formed on the friction rod.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF THE PREFERRED EMBODIMENT

Hereinafter, a preferred embodiment of the present invention is described in detail with reference to the accompanying drawings.

Figure 1:
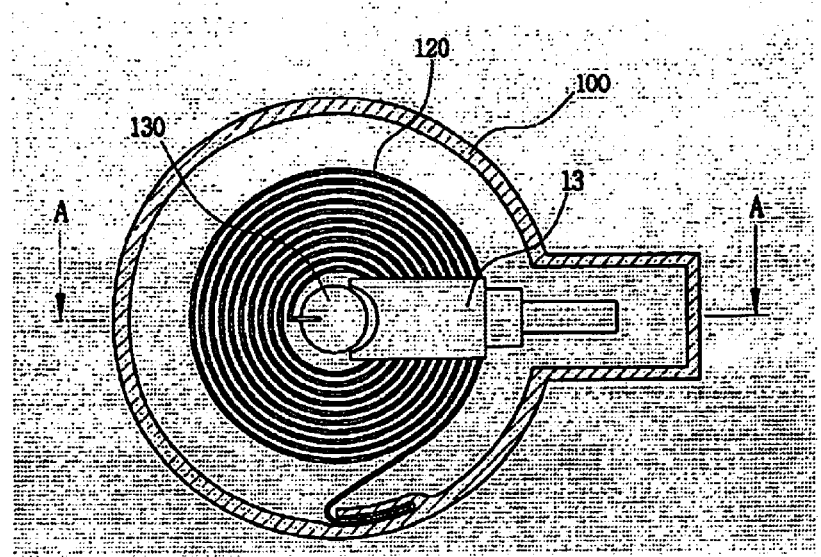
FIG. 1 is a sectional view of a drum containing a spiral spring of a seatbelt retractor according to an embodiment of the present invention.

As shown in FIG. 1, a seat belt retractor according to the present invention includes a drum 100 with a spiral spring 120 providing retracting force wound around a shaft 130 where one end of the webbing is securely fixed. Therefore, as the webbing 110 is drawn out, the spiral spring 120 stores elastic energy while decreasing in diameter. During retraction of the webbing 110, the spiral spring 120 discharges the stored elastic energy while expanding in diameter.

A seat belt retractor according to the present invention also may include a vehicle sensor (not shown), composed of a ball, a ball housing, a pawl, and a latch so as to prevent a webbing from being drawn out in a collision or other abnormal state of the vehicle. As is known in the art, the ball is disposed in the ball housing and moves toward the pawl due to inertia or vibration that occurs in a collision or other abnormal state. Subsequently, the pawl, pivotally fixed to the retractor, pushes the latch upward to engage with a ratchet wheel mounted on the shaft, whereby the retractor can prevent the webbing from being drawn out. When the webbing is retracted, the latch becomes free from interference with the ratchet wheel so that the ratchet wheel and shaft can freely rotate.

With a drum 100 as described above, an embodiment of the present invention is provided with a frictional clutching means that reduces rotating speed of the drum shaft 130 in response to the expansion of the spiral spring 120 during a retraction of the webbing 110 in order to prevent the vehicle sensor from locking, which can be caused by an excessive retraction and mechanical shock.

Figure 2:
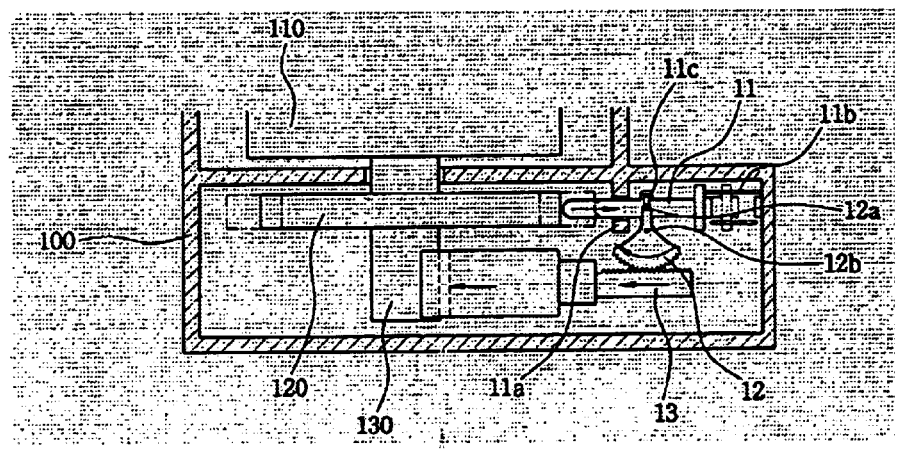
FIG. 2 is a sectional view of FIG. 1, taken along the line A—A.

As shown in FIG. 2, the frictional clutching means is disposed adjacent to the drum shaft 130 in a radial direction of the spiral spring. The frictional clutching means comprises a first rod member 11 that laterally slides in response to the expansion of a spiral spring 120 by contacting a proximal end thereof to the outer surface of the spiral spring 120. The first rod member 11 is slidably inserted into a guide element 11a. The first rod member 11 is also provided with an elongated guide slot 11c at the center thereof. Installed at the distal end of the first rod member 11 is a restoring spring 11b for elastically supporting the first rod member 11 so that contact with the spiral spring 120 can be maintained. The frictional clutching means further comprises a gear member 12 pivotally fixed to the drum 100 by a pivot shaft 12b and slidably connected to the guide slot 11c of the first rod member 11 by a guide pin 12a. The frictional clutching means further comprises a second rod member 13 having a toothed part on the surface thereof in order to mesh with the gear member 12 so that the second rod member 13 slidably moves in a lateral direction while the gear member 12 is pivoting in response to the movement of the first rod member 11.

Figure 3:
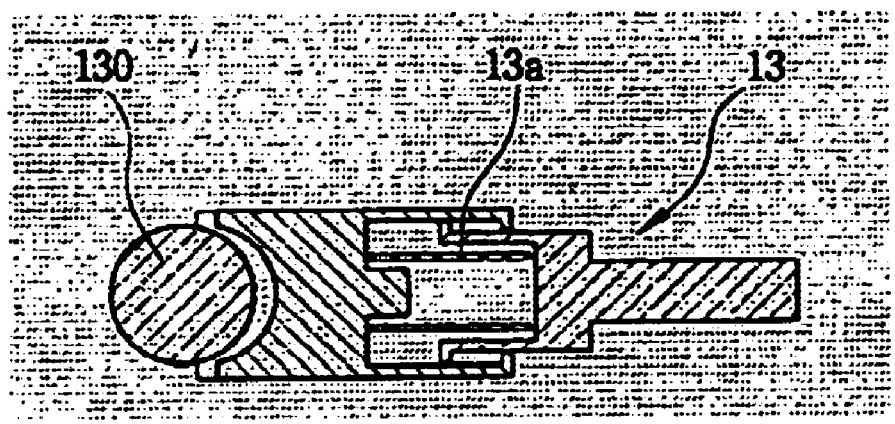
FIG. 3 is a sectional view of a second rod member of a seatbelt retractor according to an embodiment of the present invention.

As shown in FIG. 3, a semicircular recess is formed at the distal end of the second rod member 13. Moreover, the second rod member 13 is composed of two parts having different radii from each other, the two parts being elastically connected by a spring 13a. The reason for providing such a second rod member of combined type is to prevent a stop of rotation of a shaft 130 by providing a buffer, in case that a frictional force larger than the rotating force of the shaft 130, which is caused by sudden expansion of the spiral spring 120, is applied to the shaft 130.

Hereinafter, the operation of the embodiment according to the present invention will be described in detail. When a passenger pulls webbing 110 to buckle up a seatbelt, a spiral spring 120 shrinks due to rotation of the shaft 130. During a retraction of the webbing 110, the spiral spring 120 expands while outwardly pushing first rod member 11 in radial direction. In accordance with the movement of the first rod member 11, gear element 12 rotates clockwise about pivot shaft 12b. Subsequently, second rod member 13, engaged with the gear element 12, moves toward the shaft 130. When the second rod member 13 is applied to the drum shaft 130, friction between the second rod member 13 and drum shaft 130 is gradually increased by means of spring 13a disposed inside of the second rod member 13, so that rotating speed of the drum shaft 130 is appropriately controlled without stopping during the retraction of the webbing.

As a result, the embodiment according to the present invention effectively prevents a webbing from being excessively retracted and reduces a mechanical shock generated by sudden expansion of a spiral spring, so that locking of a vehicle sensor is preferably prevented.

Even though the present invention is described in detail with reference to one embodiment, it is not intended to limit the scope of the present invention. It is evident from the foregoing that many variations and modifications may be made by a person having an ordinary skill in the present filed without departing from the essential concept of the present invention.

What is claimed is:

1. A seatbelt refractor comprising a frictional clutching means equipped in a drum, said clutching means acting between the drum and a drum shaft rotatable within the drum to reduce rotating speed of the drum shaft, to which a webbing and spiral spring are fixed, in response to expansion of said spiral spring during retraction of the webbing, and wherein the frictional clutching means comprises:

a first rod member slidably inserted into a guide element so that the first rod member can slide through said guide element in accordance with expansion of the spiral spring, the first rod member being provided with a guide slot at the center thereof;

a restoring spring installed at one end of said first rod member for elastically supporting said first rod member;

a gear member pivotally fixed to a drum by a pivot shaft and slidably connected to said guide slot by a guide pin; and, a second rod member that slidably moves engaging with tooth of said gear member.

2. A seatbelt refractor according to claim 1, wherein the second rod member has a semicircular recess at one end thereof for contact with a circumference of the drum shaft.

3. A seatbelt retractor according to claim 2, wherein the second rod member is composed of two parts that are elastically supported with each other by a spring.

4. A seatbelt retractor according to claim 1, wherein the second rod member is composed of two parts that are elastically supported with each other by a spring.

5. A seatbelt retractor, comprising:

a drum containing a rotatable drum shaft and a spiral spring acting between the drum and shaft, said shaft configured and dimensioned for winding a seatbelt webbing thereon; and a frictional clutch operatively connected to said spiral spring and acting on said drum shaft in response to an increase in diameter of the spiral spring, wherein said frictional clutch comprises:

an actuator rod slidably mounted with the drum and bearing against the spiral spring;

a friction rod bearing against the drum shaft;

a linkage operatively connecting the actuator rod and friction rod so as to apply pressure to the drum shaft in response to expansion of the spiral spring.

6. The seatbelt retractor of claim 5, further comprising a biasing element acting on said actuator rod to bias it against the spiral spring.

7. The seatbelt retractor of claim 5, wherein said linkage comprises:
- a gear segment privotably mounted between said rods;
- a first end of said gear segment being acted on by said actuator rod; and
- a second, geared end of said gear segment being engaged with gear teeth formed on said friction rod.

8. The seatbelt retractor of claim 5, wherein said friction rod comprises a first part and a second part with a biasing element acting therebetween.

* * * * *